United States Patent [19]
Janke et al.

[11] Patent Number: 5,965,058
[45] Date of Patent: *Oct. 12, 1999

[54] DEICING COMPOSITION AND METHOD

[75] Inventors: George A. Janke, West Palm Beach; Warren D. Johnson, Jr., Palm City, both of Fla.

[73] Assignee: Ice Ban USA, Inc., North Palm Beach, Fla.

[ * ] Notice: This patent is subject to a terminal disclaimer.

[21] Appl. No.: 08/867,788

[22] Filed: Jun. 3, 1997

Related U.S. Application Data

[63] Continuation-in-part of application No. 08/589,497, Jan. 22, 1996, Pat. No. 5,635,101.

[51] Int. Cl.$^6$ .............................. C09K 3/18; C09K 3/00
[52] U.S. Cl. ..................... 252/70; 106/13; 106/14.05; 106/14.11; 106/14.21; 106/14.44; 47/2
[58] Field of Search ................ 106/13, 14.05, 106/14.11, 14.21, 14.44; 252/70; 47/2

[56] References Cited

U.S. PATENT DOCUMENTS

| | | | |
|---|---|---|---|
| 1,581,179 | 4/1926 | Crofoot | 252/73 |
| 3,489,596 | 1/1970 | Plump | 427/408 |
| 3,897,348 | 7/1975 | Atkinson | 510/521 |
| 3,976,581 | 8/1976 | Rose | 510/521 |
| 4,106,487 | 8/1978 | Randall et al. | 127/73 |
| 4,259,640 | 3/1981 | della Faille d'huysse et al. | 324/439 |
| 4,277,411 | 7/1981 | Yahl | 554/15 |
| 4,283,297 | 8/1981 | Peters et al. | 252/70 |
| 4,359,528 | 11/1982 | Devos et al. | 435/43 |
| 4,430,240 | 2/1984 | Sandvig et al. | 252/70 |
| 4,440,792 | 4/1984 | Bradford et al. | 426/271 |
| 4,486,458 | 12/1984 | Bradford et al. | 426/618 |
| 4,585,571 | 4/1986 | Bloom | 106/13 |
| 4,587,027 | 5/1986 | Preusch et al. | 252/70 |
| 4,588,512 | 5/1986 | Rippie | 252/70 |
| 4,664,832 | 5/1987 | Sandvig et al. | 252/70 |
| 4,676,918 | 6/1987 | Toth et al. | 252/70 |
| 4,746,449 | 5/1988 | Peel | 252/70 |
| 4,824,588 | 4/1989 | Lin | 252/70 |
| 4,937,104 | 6/1990 | Pühringer | 427/344 |
| 4,953,360 | 9/1990 | Rzechula | 106/13 |
| 4,980,282 | 12/1990 | de Troostembergh et al. | 435/43 |
| 5,067,982 | 11/1991 | Caransa et al. | 127/67 |
| 5,089,052 | 2/1992 | Ludwig | 106/276 |
| 5,135,674 | 8/1992 | Kuhajek et al. | 252/70 |
| 5,283,322 | 2/1994 | Martin et al. | 530/374 |
| 5,302,307 | 4/1994 | Ireland | 252/70 |
| 5,324,442 | 6/1994 | Matthews | 252/70 |
| 5,366,650 | 11/1994 | Wiesenfeld et al. | 252/70 |
| 5,376,292 | 12/1994 | Lucas | 252/70 |
| 5,563,069 | 10/1996 | Yang | 435/295.3 |
| 5,635,101 | 6/1997 | Janke et al. | 106/13 |
| 5,645,755 | 7/1997 | Wiesenfeld et al. | 252/70 |

FOREIGN PATENT DOCUMENTS

| | | |
|---|---|---|
| 2135662 | 5/1996 | Canada . |
| 0221269 | 8/1986 | Germany . |
| 3733080 | 9/1987 | Germany . |
| WO8703293 | 6/1987 | WIPO . |

OTHER PUBLICATIONS

PCT International Search Report completed Apr. 28, 1997 for PCT/US97/01008.
PCT International Search Report completed Jul. 4, 1997 for PCT/US97/04440.
PCT International Search Report completed Jul. 4, 1997 for PCT/US97/04374.

*Primary Examiner*—Anthony Green
*Attorney, Agent, or Firm*—Baker & Botts, L.L.P.

[57] ABSTRACT

Disclosed is a new and improved, environmentally acceptable and negligibly corrosive deicing composition comprising steepwater solubles produced, for example, as by-products from a wet milling process of corn, which by-products are biodegradable. The invention also relates to the use of a deicing composition to reduce the buildup of snow and ice on roads, bridges and other outdoor surfaces.

40 Claims, No Drawings

DEICING COMPOSITION AND METHOD

REFERENCE TO RELATED APPLICATIONS

This patent application is a continuation-in-part of a copending U.S. patent application Ser. No. 08/589,497 filed Jan. 22, 1996, which issued as U.S. Pat. No. 5,635,101 on Jun. 3, 1997.

FIELD OF THE INVENTION

The present invention is directed to deicing compositions comprising steepwater solubles. Such compositions are useful for deicing outdoor surfaces, as antifreezes and as fertilizers as the compositions are environmentally acceptable and negligibly corrosive. The invention also relates to methods for reducing the accumulation of snow and ice on outdoor surfaces such as roads, bridges, runways and taxiways utilizing the compositions of the invention.

BACKGROUND OF THE INVENTION

It is well known that the ice and snow located on roads and bridges significantly slow traffic and pose increased danger to the general public. Mechanical snow removal is often used to alleviate some of the traffic problems. It is also known that chemical compounds, such as chloride salts, whether in solid form or in solution or in admixture with sand and other substances, are often used to treat the roadways to melt snow and ice. Most deicing compounds, however, are environmentally harmful, and therefore, municipalities are often restricted in the amounts and types of substances that they may use to help control the buildup of snow and ice.

Most chemicals used to treat roadways are detrimental for the following reasons: They damage the soil and surrounding vegetation by turning the soil alkaline and damaging the root systems of the plants; They damage freshwater streams, rivers and lakes and are often absorbed into underground water systems; and, The chemicals cause significant damage to vehicles, as well as concrete and metallic structures that are near roadways because of the corrosive effects of said chemicals. It is well known that many salts cause spalling in concrete structures, which significantly reduce the strength and life of such structures. For the foregoing reasons, many states have banned the use of salts and other chemicals, while others have placed significant restrictions on their usage.

It is known that it is desirable to replace the corrosive salts with non-corrosive substances, such as alcohols and glycols, but because of their flammability, toxicity and expense, these other substances have not been effectively and economically utilized to date. Therefore, a need has arisen for a minimally corrosive, environmentally acceptable, cost-effective, deicing composition.

SUMMARY OF THE INVENTION

The present invention overcomes the problems and disadvantages associated with current deicing compositions and provides compositions and methods that are a minimally corrosive, environmentally acceptable and cost effective. The compositions of the invention cause little or no corrosion to surrounding metal objects or vehicles, nor do the compositions damage the environment as would chloride salts and other chemicals. The compositions are also biodegradable and environmentally friendly and can be utilized as fertilizers.

The present invention is directed to environmentally acceptable deicing compositions that comprise steepwater solubles. Steepwater solubles are by-products of the milling process of grains such as the wet milling of corn. Compositions are water soluble, negligibly corrosive, inexpensive and widely-available in large quantities. The present invention is also directed to the use of said deicing composition to keep roads, bridges, runways taxiways and other outdoor surfaces free of ice and snow. The present invention is also corrosion-inhibiting and acts as a fertilizer. Deicing compositions of the invention can be used prophylactically to prevent the accumulation of snow and ice to a surface and to reduce or eliminate snow and ice subsequent to their accumulation.

In another embodiment, a method for inhibiting corrosion of a surface exposed to a corrosive substance may comprise applying a composition containing steepwater solubles to said surface. In yet another embodiment, a method for reducing the corrosive effects of a deicing salt may comprise adding steepwater solubles to said corrosive salt.

Preferably, deicing compositions have suitable water solubility, have a low freezing temperature in solution, are availability on an industrial scale at a low or acceptable costs, are low or minimally corrosive, are environmentally acceptable, and are capable of being applied by conventional generally known and available means.

In view of the foregoing, it is a primary object of the present invention to provide a deicing composition suitable for making surfaces free of snow and ice, which composition is water soluble, has a low freezing temperature, is cheaply and readily available in large industrial quantities throughout the world, is negligibly corrosive, is environmentally friendly, and is capable of being applied with currently available equipment and by existing crews.

A related object of the present invention is to provide an environmentally friendly, negligibly corrosive deicing composition at a cost-competitive price.

Yet another object of the present invention is to provide an environmentally friendly, negligibly corrosive deicing composition that can be used in admixtures with sand, river gravel, cinders, sawdust, or other skid-reducing, manufactured grit and subsequently applied to roads, bridges, runways, taxiways and other surfaces where it is desirable to keep said surfaces free of snow and ice.

Another object of the present invention is to provide an environmentally friendly deicing composition that can be used to pretreat roads, bridges and other outdoor surfaces prior to the accumulation of snow and ice to prevent the adherence of snow and ice to said surfaces.

Yet another object of the present invention is to provide an environmentally friendly, negligibly corrosive deicing composition that can be used in admixtures or mixtures with other chemical deicing agents and/or skid-reducing chemical agents and subsequently applied to roads, bridges, runways, taxiways, and other surfaces where it is desirable to keep said surfaces free of snow and ice.

Another object of the present invention is to provide a process for making roads, bridges, runways, taxiways and other outdoor surfaces free of ice and snow, which process comprises applying the deicing composition of the present invention onto such surfaces prior to ice or snow, either by itself, or in mixture or admixture with chemical deicing or other skid-reducing additives.

Another object of the present invention is to provide a corrosion-inhibiting composition. Said composition can be used in combination with chloride salts and other corrosive substances to reduce their harmful effects to the environment.

Another object of the present invention is to provide a fertilizer which can be used to help prevent the accumulation of snow and ice on plants.

Another object of the present invention is to provide a method of fertilizing plants in a manner which helps prevent the accumulation of snow and ice thereon.

Other embodiments and advantages of the invention are set forth, in part, in the description which follows and, in part, will be obvious from this description or may be learned from the practice of the invention.

DESCRIPTION OF A PREFERRED EMBODIMENT

As embodied and broadly described herein, the present invention is directed to a composition comprising steepwater solubles and to environmentally friendly methods for applying and utilizing steepwater solubles to prevent or reduce the accumulation of snow and ice on outdoor surfaces and as an anti-freeze.

The deicing composition of the present invention is a by-product of a milling process of grain including, for example, the wet milling of shelled corn, wheat, sorghum, barley and soybeans. A wet milling process for corn, for example, is often employed to obtain staple products such as corn oil, dextrose, corn syrup, high fructose corn syrup, dextrins, dry starches and animal feeds. While the process is described below in connection with shelled corn, it is to be understood that steepwater can be created as a byproduct in an essentially similar process using wheat, sorghum, barley or soybeans as well as a by-product in the milling of other grains.

The principle steps in a wet milling of shelled corn include steeping, milling, recovering and processing. During the steeping process, corn kernels are softened by soaking them in a hot solution containing a very small amount of sulfuric dioxide or other similar acidic component (though sulfuric dioxide is normally omitted when the grain is wheat because it destroys the vitality of wheat gluten). The softened kernels are then separated from the steepwater and further processed depending upon the desired end product. The remaining steepwater contains solubles which, after the steepwater is evaporated and/or dried, are typically recovered for use as nutritional additives in feeds for livestock. Although drying is preferred, steepwater solubles can be utilized in the form obtained from the milling process or dried to a water content of less than about 50%, by weight, preferably less than about 25%, more preferably less than about 10% and even more preferable less than about 5%. Essentially dry steepwater solubles with a water content of about 1–2% is preferable for economical transport and for economical application of compositions of the invention. Typically, before any drying, steepwater contains between 10% and 30% solubles. By drying, the ratio may be adjusted to any desirable level.

Accordingly, deicing compositions of the invention may comprise by weight less than 100% steepwater solubles, preferably between about 3% to 95% by weight of steepwater solubles in admixture with between about 5% to about 97% water, and more preferably from about 14 to about 80% by weight of steepwater solubles in admixture with between about 20 to about 86% by weight of water. Compositions may be further admixed with optional additives such as skid-reducing agents and conventional deicing and antifreeze compositions. For example, skid reducing agents include sand, gravel such as river gravel, manufactured grit, cinders, sawdust, or other organic, non-organic and synthetic materials. Conventional anti-freeze compositions include, for example, glycols such as ethylene glycol, diethylene glycol, propylene glycol, dipropylene glycol and glycol monoethers. These and other anti-freeze compositions contain water and water-soluble liquid alcohol freezing point depressants and are well known to those of ordinary skill in the art. The percentage by weight of steepwater solubles and the percentage by weight of any accompanying liquid varies with the needs of the user. For example, the range of about 14% to about 80% by weight of steepwater solubles in admixture with about 20% to about 86% by weight of liquid is preferable when the composition is to be sprayed upon a surface. A range of about 86% to about 97% by weight of steepwater solubles in admixture with about 3% to about 14% liquid is preferable when a dryer composition is desired, for example, when the deicing composition is to be applied with a shovel or truck-mounted spreader. When the steepwater solution is admixed with skid reducing agents, the skid reducing agents may compromise greater than 50% by weight of the admixture.

The compositions of the present invention are excellently suited to serve as deicers which are compositions that reduce or prevent the accumulation of freezing precipitation. Deicing compositions also include anti-freeze compositions which are added to another composition to reduce the freezing temperature or prevent the freezing of that solution. Compositions of the invention preferably have both deicing and anti-freeze properties.

Deicing composition of the invention can be applied to road surfaces prior to the accumulation of snow and ice, which application will help prevent the snow and ice from adhering to the road surfaces. Subsequent to the accumulation of snow and ice, the deicing composition of the present invention is again applied, but this time to reduce the accumulated freezing precipitation such as snow and ice. The two-step application facilitates removal of the accumulated snow and ice by plows and other mechanical methods.

In some applications, it is desirable that the composition of the present invention be mixed or admixed with chloride salts, and possibly calcium magnesium acetate and urea (though the addition of chloride salts, depending on its concentration, may degrade the low corrosiveness and the environmentally friendliness of the present invention). Deicing compositions of the invention also serve as a corrosion inhibiting agents when mixed with chloride salts. The corrosive effects of an admixture of the composition of the present invention with five percent by weight of chloride salts is significantly less than, for example, an admixture of 95 percent water and five percent salts. Thus, the composition of the present invention can be effectively mixed with small amounts of salt without significantly affecting the other characteristics of the composition and, in fact, synergistically to reduce the corrosive effects of the added salt.

According to a further aspect of the present invention, a process for making road surfaces free of snow and ice is provided, said process comprising the application of the composition of the present invention onto the road surfaces prior to icing or snow accumulation. The composition may be preferably applied onto the road surface from moving vehicles in an amount of about 20 to about 60 gallons per lane mile (GPLM), which is about 200 to about 600 pounds per lane mile, which is also equivalent to about 0.48 to about 1.44 ounces per square yard. The composition may also be applied after snow and ice has accumulated in order to melt said snow and ice.

Steepwater solubles are also safe and possess no undue hazards to humans, animals or the environment from the handling, storing, or use of steepwater even when concentrated. Condensed steepwater is currently used as a low grade animal feed additive or for other low value uses.

According to a further embodiment of the present invention, a method for inhibiting corrosion of a surface exposed to a corrosive substance may comprise applying a composition containing steepwater solubles to said surface. Such corrosive substances include sodium chloride, calcium chloride, potassium chloride, magnesium chloride and combinations thereof When such salts are to be applied, the corrosive effects of said salts may alternatively be reduced by adding steepwater solubles to said salts. In one embodiment, the method may comprise applying a composition of said salt with about 10% to about 75% by weight of steepwater solubles.

The composition of the present invention can also be cost effectively utilized by airports to prevent the accumulation of snow and ice on runways and taxiways. Many airports today use glycols for deicing an airplane's wings and stabilizers, for which the airports pay sewage treatment processing fees for treatment of the runoff. Such fees can range up to $3.00 per gallon of glycol-contaminated water. Compositions of the invention can be used to replace the use of glycol for these purposes. The elimination of glycol is better for the environment and avoids the need for processing glycol contaminated water, which process demands rigid and costly quality control techniques. In addition, steepwater solubles, being relatively non-corrosive (as compared to water), are not harmful to structures, working engines or their component parts such as turbine or propeller blades. When present, solubles can be removed by rinsing with water or other mild soaps or detergents without damage to the structure. Alternatively, solubles are nearly completely vaporized by burning and incineration.

The following examples illustrate embodiments of the present invention, but should not be viewed as limiting the scope of the invention.

EXAMPLES

Steepwater Formed By Wet Milling of Corn

Steepwater is commonly formed as a byproduct from the wet milling of corn. Though the actual composition of steepwater so formed varies from batch to batch, and from field to field, one steepwater concentrate derived from a wet milling process for corn had a partial composition as follows:

| ITEM | DRY BASIS (No Moisture) | CONDENSED (48% solids/52% Moisture) |
|---|---|---|
| Crude Protein | 33.0% | 16.0% |
| Crude Fat | 0.2% | 0.1% |
| Acid Detergent Fiber | 0.66% | 0.32% |
| Phosphorus | 2.31% | 1.12% |
| Calcium | 0.02% | 0.01% |
| Sulfur | 0.56% | 0.27% |
| Potassium | 2.74% | 1.32% |
| Magnesium | 1.08% | 0.52% |
| Sodium | 0.13% | 0.06% |
| Iron | 145 ppm | 70 ppm |
| Aluminum | 22 ppm | 10 ppm |
| Manganese | 34 ppm | 17 ppm |
| Copper | 8 ppm | 4 ppm |
| Zinc | 140 ppm | 68 ppm |
| Total Ash | 27% | 5.4–21.68% |

The above composition is intended only to be a representative composition, and the absence of one of more of listed items, or the presence of additional unlisted items, is not deemed to limit the present invention. Moreover, the percentages of the various components will also vary from batch to batch, and from grain to grain. Therefore, it is contemplated, for example, that steepwater may have between about 15% and about 50% by weight of crude protein, from about 0.1% to about 2.0% by weight of crude fat, and from about 20% to about 50% by weight of ash. The above specified ranges are merely exemplary and are not intended to limit the scope of the invention. Another sample of steepwater is presented and analyzed in U.S. Pat. No. 4,976,767, issued Dec. 11, 1990 to Kinnersley et al. (column 4).

Steepwater Formed Using Wet Milling of Soybeans

Steepwater is formed from the wet milling of soybeans. The kernels of soybeans are softened by soaking in a hot solution containing a very small amount of sulfuric dioxide, or by another similar process, whereby the beans are separated from the hull. Upon removal of the beans, the resulting aqueous by-product comprises steepwater solubles useful as a deicing composition.

Steepwater Formed Using Wet Milling of Wheat, Barley or Sorghum

Steepwater is formed from the wet milling of wheat, barely or sorghum, though typically no sulfuric dioxide is added to the water during the steeping process for wheat. Sulfuric dioxide destroys the vitality of wheat gluten. The grains of the wheat or sorghum are softened by soaking in a hot solution, or by another similar process, whereby the wheat, barley or sorghum can be separated from the germ. Upon removal of the grain, the resulting by-product comprises steepwater solubles useful as a deicing composition.

Manufactured Steepwater

Steepwater is manufactured by the mixing, either in liquid or solid form, of the components of, for example, steepwater solubles obtained from any of the above-identified processes. All of the components of steepwater prepared by these processes are commercially available. Components are prepared separately and mixed together to form manufactured steepwater solubles of the invention. Variations in a composition can also be easily manufactured and tested as appropriate by one of ordinary skill in the art for applicability for a particular use. For example, manufactured steepwater solubles with a decreased fat content can be more useful in the aircraft industry where accumulated crude fat may harm aircraft parts. However, higher protein content may be desirable in agriculture to prevent the accumulation of damaging amounts of snow on plants while providing large amounts of usable nitrogen as a fertilizer that will be available for the growing season.

Typically, manufactured steepwater solubles can be formed by combining of one of more of the following components: crude protein, crude fat, ash, phosphorous, calcium chloride, sulfur, potassium chloride, magnesium chloride, sodium chloride, iron, aluminum chloride, manganese chloride, copper and zinc in concentrations similar to the amounts provided above or in amounts that can be empirically tested by one of ordinary skill in the art. The manufactured steepwater solubles may be optionally mixed with phosphorous, calcium chloride, sulfur, potassium chloride, magnesium chloride, sodium chloride, iron, aluminum chloride, manganese chloride, copper and zinc.

Modified Steepwater

Steepwater solubles obtained from milling or manufacturing are modified by the addition or removal of one or more components. For example, steepwater solubles may be modified by removal of iron. Iron-depleted steepwater is useful in instances where the addition of iron is undesirable such as in and around airports. Iron is easily removed by applying a magnetic force to a steepwater composition such that iron, both in particulate form and as molecular iron, will be attracted to the magnet. Once attracted to the magnet, iron is easily removed by removing the magnet. Alternatively, substantially all of the metals may be removed. Alternatively, protein can be removed by the addition of appropriate proteases to digest protein into its chemical constituents such as carbon-based small molecules, ammonia and water. Similarly, crude fat can be digested or simply treated with a mild detergent to break any aggregates. These and many other methods to modified steepwater solubles can be performed using the disclosures provided herein by one of ordinary skill in the art.

Steepwater Coatings

A mixture of 50% steepwater solubles and 50% water is sprayed on any one or more of the following components: sodium chloride, calcium chloride, potassium chloride, magnesium chloride, calcium magnesium acetate urea, sand, gravel, cinders sawdust, and manufactured grit. Thereafter the sprayed components are dried in a drum oven or other drying means. The dried, steepwater-coated composition is applied as a deicing composition.

Dried Steepwater

A mixture of steepwater solubles and water is dried in a drum oven or other drying means until the moisture content falls below about 10%, or lower. The dried steepwater is applied as a deicing composition. Dried steepwater can also be added to other compositions to function as an anti-freeze. The dried steepwater may also be rehydrated with water prior to application as a deicing composition. For example, the dried steepwater may be rehydrated with water such that the solution contains greater than about 5% of water.

Steepwater as a Plant Protector

A mixture of steepwater and water is spayed on plants to reduce the accumulation of snow and ice thereon, which mixture also acts as a fertilizer and is not harmful to plants or animals that may be in the area. Plant growth is encouraged in the growing season with the presence of the steepwater solubles which may have degraded or fermented over time thereby making the chemical components of the solubles more readily available to the plant cells. Accordingly, there is no need to remove the compositions from the area as the compositions as well as components are not harmful.

ADVANTAGES

Advantages of the composition according to the present invention may be summarized as follows:

1) The composition of the present invention is neither overly corrosive nor environmentally unacceptable. This is a significant advantage over known compositions which damage vehicles, road ways, and the surrounding environment.

2) A 50% steepwater soluble-50% water composition of the present invention has a freezing point below 0° F. It is liquid and free flowing at +10° F., and can be easily sprayed and applied to road surfaces or accumulated ice or snow at ambient temperatures. The composition can also be heated before its application to allow spray application at lower temperatures.

3) The composition can be applied in comparatively small amounts because once applied to the road surface, the composition of the present invention tends to remain in place and is not easily blown away by the wind or by the action of passing traffic, and the composition tends to prevent the adherence of snow and ice to the surfaces upon which it is applied.

4) The composition can be applied during any prevailing temperature and/or prior to impending snow and ice storms.

5) The composition can easily be applied to the roadways with uniformity using readily available equipment without any special training for the application crews.

6) The composition can be applied in the form of a solution, which allows for quick and even application by vehicles, even at speeds of 35 mph or more.

7) The composition is a low grade, low price industrial by-product available in large quantities in many of the states located in the Snow Belt. Its production in potential market areas will help reduce transportation costs.

8) The composition is a renewable agricultural by-product, and its commercial usage will help support U.S. farmers and the agricultural industry.

9) The composition of the present invention is biodegradable, and yet has a low biological oxygen demand (BOD). The BOD of a substance is a unit-less number that represents the ratio of oxygen utilized (in lbs.) per pound of said substance. The BOD in effect represents the metabolic needs of aerobic microorganisms in organicly rich matter. Most known deicers are not bio-degradable (and hence have a BOD of 0)— instead, they accumulate and become poisonous to the environment. One known deicer which is biodegradable is calcium magnesium acetate (CMA), but the present invention has a substantially lower BOD than does CMA.

10) The composition of the present invention can be cost effectively utilized by airports to prevent the accumulation of snow and ice on runways and taxiways, hence eliminating or further reducing the need for other chemical deicers which are known to be environmentally unfriendly and potentially or actually damaging to aircraft parts including component parts of aircraft engines.

11) The composition of the present invention can be used to treat plants in preparation of a snow or ice storm to help reduce the accumulation of snow or ice on the plants. Deicing compositions of the invention contain nutrients such as phosphorous and nitrogen in chemical forms available for use by the metabolic processes of the plant or convertible by, for example, nitrogen fixation into useful forms of nitrogen by microorganisms that exist in the soil.

SUMMARY OF TESTING

Further details of the present invention are to be found in the following test results without limiting the scope of protection to the specified mixture of composition of the present invention. For the tests, mill run steepwater, concentrated at approximately 50% by weight of dry substance, is applied at an external temperature of 14° F. to a 3.5 inch thick snow sheet of approximately 20 square yards without any additive. For comparison, a readily recognized and available mixture of industrial salts and sand is applied to a second 3.5 inch thick snow sheet of approximately 20 square yards in a nearby location. It was found that the melting effect of the composition having a dry substance content of 50% by weight is superior to that of the mixture of salt and sand, both in duration of effect and the strength of activity. The composition of the present invention having a dry substance content of 50% by weight exhibited a melting effect one hour and a half earlier than the mixture of salt and sand. Moreover, the 50% concentration of the present invention is active even at temperatures as low as 7.5° F., while the melting effect of the salt and sand mixture slows and completely stops at approximately 20° F.

Further testing was done utilizing varying concentration of steepwater, varying between 30% and 60% by weight of dry substance, and at various ambient temperatures. Tests were conducted for anti-icing prior to icing, as well as for deicing subsequent to icing. In all cases the results of the steepwater product were equal to superior to the other known, currently used deicing agents.

Additional testing has been performed to evaluate the composition of the present invention for corrosiveness, biological degradation demands, and efficacy at varying temperatures. The results are discussed below.

CORROSION TESTS

Mild steel bolts were immersed in various concentrations of steepwater. After four months of immersion, the bolts showed virtually no evidence of rust or oxidation. Laboratory corrosion tests measured the corrosive effect at 0.53 mils per year (MPY), which is much lower than any other chemical deicing agent and is a small fraction of the corrosiveness of pure water.

Mild steel bolts were sprayed regularly with various concentrations of steepwater. After four months of regular spraying, the bolts showed virtually no evidence of rust or oxidation. Instead of corroding, the bolts appeared to have been sealed by a layer of dried steepwater, which coating appeared to be protective rather than destructive.

The following tables summarizes some of the test results:

| MATERIAL | CORROSION (mils per year - MPY) |
| --- | --- |
| Mild Steel | 0.50 |
| Stainless Steel | None detectable |
| Aluminum | None detectable |

In comparison, mild steel bolts subjected to similar test conditions as described above, but utilizing mixtures of water and with 5% concentrations of various chloride salts, exhibited extreme corrosion, rust, and deterioration.

ENVIRONMENTAL TESTS

Tests were performed to measure the biological oxygen demand (in pounds) per pound of various mixtures of the composition of the present invention. Again, the BOD represents the metabolic needs of aerobic microorganisms in organic matter. Results appear below:

| CONCENTRATION (by weight) | BOD DEMAND (lb. of $O_2$ per lb. of material) |
| --- | --- |
| 25% solids | .13–.15 |
| 48% solids | .21–.26 |

The composition of the present invention is currently used as a low grade animal feed additive. Because it is widely accepted by the livestock industries and is not known to leave deleterious traces of any harmful substances in the animals being fed, it is believed to be completely safe to the environment and safe to handle as well.

FREEZING, DEICING, AND ANTI-ICING TESTS

The following results describe the consistency of a mixture of the present invention concentrated at 48% solids:

| TEMPERATURE (° F.) | DESCRIPTION |
| --- | --- |
| +20 | Free Flowing Liquid |
| +10 | Thin Syrup |
| 0 | Thick Molasses |
| −20 | Thick Putty-like |

The following table summarizes the freezing points and provides more quantitative information on a typical mill run steepwater solution containing approximately 50% solubles:

| SOLUTION CONCENTRATION | | FREEZING TEMPERATURE | VISCOSITY (SSU) | | | |
| --- | --- | --- | --- | --- | --- | --- |
| (°Brix) | (°Baumé) | (° F.) | (@20° F.) | (@70° F.) | BOD | pH |
| 50 | 30 | 0 | 475 | 195 | .235 | 4.2 |

"Brix" is the measurement on a hydrometer scale that indicates the relative percentage by weight of a substance in solution. "Baumé" is a measurement on a hydrometer scale that indicates the specific gravity of a substance.

While the melting effect of chloride salts is limited (ineffective below approximately 20° F.), the melting effect of the composition of the present invention, as demonstrated by the tables above, is active even at temperatures as low as 7.5° F.

Other embodiments and uses of the invention will be apparent to those skilled in the art from consideration of the specific practice of the invention disclosed herein. All documents disclosed herein, including U.S. Pat. No. 4,976,767 (issued Dec. 11, 1990 to Kinnersley et al.), and U.S. Pat. No. 4,255,518 (issued Mar. 10, 1981 to Muller et al.), and are specifically incorporated by reference. The specification and examples should be considered exemplary only with the true scope and spirit of the invention indicated by the following claims.

What is claimed is:

1. A deicing composition comprising steepwater solubles, said steepwater solubles being derived from steeping a grain.

2. The deicing composition of claim 1 wherein the steepwater solubles contain from about 15% to about 50% by weight of crude protein.

3. The deicing composition of claim 1 wherein the steepwater solubles contain from about 0.1% to about 2.0% by weight of crude fat.

4. The deicing composition of claim 1 wherein the steepwater solubles contain from about 20% to about 50% by weight of ash.

5. The deicing composition of claim 1 wherein the steepwater solubles are produced by wet milling a grain.

6. The deicing composition of claim 5 wherein the grain is a corn.

7. The deicing composition of claim 5 wherein the grain is a soybean.

8. The deicing composition of claim 5 wherein the grain is a wheat.

9. The deicing composition of claim 5 wherein the grain is a barley.

10. The deicing composition of claim 5 wherein the grain is a sorghum.

11. The deicing composition of claim 1 where in the steepwater solubles contain at least one component selected from the group consisting of crude protein, crude fat, fiber, phosphorous, calcium, sulfur, potassium, magnesium, sodium, iron, aluminum, manganese, copper, zinc and ash.

12. The deicing composition of claim 1 which contains less than about 5% by weight of water.

13. The deicing composition of claim 1 which contains greater than about 25% by weight of water.

14. The deicing composition of claim 1 which contains greater than about 50% by weight of water.

15. The method of claim 1 wherein said steepwater solubles are applied to said surface before the freezing precipitation occurs.

16. The deicing composition of claim 1 which contains a skid-reducing component.

17. The deicing composition of claim 16 wherein the skid-reducing component is selected from the group consisting of sand, gravel, cinders, sawdust, manufactured grit and combinations thereof.

18. The deicing composition of claim 16 wherein the skid-reducing component comprises greater than 50% by weight of said composition.

19. The deicing composition of claim 1 further comprising at least one component selected from the group consisting of sodium chloride, calcium chloride, potassium chloride, magnesium chloride, calcium magnesium acetate, urea and combinations thereof.

20. The deicing composition of claim 1 wherein said composition is applied to a surface of a plant.

21. The deicing composition of claim 1 which is substantially free of all metals.

22. A method for inhibiting the accumulation of freezing precipitation on a surface comprising applying to said surface an effective amount of a composition for inhibiting the accumulation of freezing precipitation, said composition containing steepwater solubles that are derived from steeping a grain.

23. The method of claim 22 wherein the surface is a road surface.

24. The method of claim 23 wherein the composition is applied to said road surface at from about 20 to about 60 gallons per lane mile.

25. The method of claim 22 wherein the composition further contains a skid-reducing component.

26. The method of claim 25 wherein the skid-reducing component is selected from the group consisting of sand, gravel, cinders, sawdust, manufactured grit and combinations thereof.

27. A method for inhibiting corrosion of a surface exposed to a corrosive substance comprising applying a composition containing steepwater solubles to said surface, said steepwater solubles being derived from steeping a grain.

28. The method of claim 27 wherein the corrosive substance is selected from the group consisting of sodium chloride, calcium chloride, potassium chloride, magnesium chloride and combinations thereof.

29. A method for reducing the corrosive effects of a deicing salt comprising admixing steepwater solubles to said corrosive salt, said steepwater solubles being derived from steeping a grain.

30. The method of claim 29 wherein the steepwater solubles comprise from about 10% to about 75% by weight of said composition.

31. A method for producing a deicing composition comprising wet milling a grain and collecting steepwater solubles.

32. The method of claim 31 wherein the steepwater solubles are dried to less than about 5% by weight of water.

33. The method of claim 32 wherein the steepwater solubles are rehydrated to greater than 5% by weight of water before application to a surface.

34. The method of claim 31 wherein the steepwater solubles are mixed with a skid-reducing component.

35. The method of claim 34 wherein the steepwater solubles and skid-reducing component are dried to less than about 5% by weight of water.

36. The method of claim 31 wherein the steepwater solubles are mixed with a component selected from the group consisting of sodium chloride, calcium chloride, potassium chloride, magnesium chloride, calcium magnesium acetate, and combinations thereof.

37. The method of claim 36 wherein the steepwater solubles and said component are dried to less than about 5% by weight of water.

38. A method for producing a deicing composition comprising manufactured steepwater solubles, said method comprising the step of dry mixing crude protein, crude fat, fiber and ash in amounts that render the deicing composition effective for melting ice.

39. The method of claim 38 further comprising the step of admixing one or more components selected from the group consisting of phosphorous, calcium chloride, sulfur, potassium chloride, magnesium chloride, sodium chloride, iron, aluminum chloride, manganese chloride, copper and zinc.

40. A method of preventing the accumulation of frozen precipitation on a plant comprising applying steepwater solubles to the plant, said steepwater solubles being derived from steeping a grain.

* * * * *